United States Patent
Rustomji et al.

(10) Patent No.: US 12,125,989 B2
(45) Date of Patent: Oct. 22, 2024

(54) ELECTROLYTE CHEMICAL FORMULATIONS INCORPORATING POLYMERS

(71) Applicant: SOUTH 8 TECHNOLOGIES, INC., San Diego, CA (US)

(72) Inventors: Cyrus S. Rustomji, San Diego, CA (US); Jungwoo Lee, San Diego, CA (US); Frederick Krause, Carlsbad, CA (US); Jeremy Intrator, San Diego, CA (US); Lasantha Korala, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 18/584,244

(22) Filed: Feb. 22, 2024

(65) Prior Publication Data

US 2024/0291049 A1 Aug. 29, 2024

Related U.S. Application Data

(63) Continuation of application No. PCT/US2024/016784, filed on Feb. 21, 2024.

(60) Provisional application No. 63/447,751, filed on Feb. 23, 2023.

(51) Int. Cl.
*H01M 10/42* (2006.01)
*H01M 10/0567* (2010.01)

(52) U.S. Cl.
CPC ... *H01M 10/4235* (2013.01); *H01M 10/0567* (2013.01)

(58) Field of Classification Search
None
See application file for complete search history.

(56) References Cited

U.S. PATENT DOCUMENTS

| | | |
|---|---|---|
| 6,475,653 B1 | 11/2002 | Gomez |
| 2003/0031933 A1 | 2/2003 | Shembel |
| 2008/0026297 A1* | 1/2008 | Chen ............... H01M 10/0567 429/207 |
| 2014/0125292 A1* | 5/2014 | Best ..................... H02J 7/00 429/188 |
| 2016/0261005 A1 | 9/2016 | Rustomji et al. |
| 2018/0375156 A1 | 12/2018 | Nanotek |
| 2020/0266007 A1 | 8/2020 | Rustomji et al. |
| 2021/0313611 A1 | 10/2021 | Rustomji et al. |

FOREIGN PATENT DOCUMENTS

WO WO-2022060750 A1 * 3/2022 ........ H01M 10/0525

OTHER PUBLICATIONS

Polyamide, available online at https://en.wikipedia.org/wiki/Polyamide, date unknown.*
Polyethylene glycol, available online at https://en.wikipedia.org/wiki/Polyethylene_glycol, date unknown.*
Carbon dioxide(data page), available online at https://en.wikipedia.org/wiki/Carbon_dioxide_(data_page), date unknown.*
ISR for PCT/US2024/016784 dated Jun. 26, 2024 (13 pages).

* cited by examiner

*Primary Examiner* — Anca Eoff
(74) *Attorney, Agent, or Firm* — Manuel de la Cerra

(57) ABSTRACT

The present invention discloses methods and materials for adding a polymer material to a liquified gas electrolyte solution for use in an electrochemical energy storage device such as a lithium-ion battery or a related technology to further improve the battery cell's safety properties. An example device includes an ionically conducting electrolyte comprised of a liquefied gas solvent, a salt, and a polymer. The liquefied gas solvent has a vapor pressure above 100 kPa at a temperature of 293.15 K, and the polymer is at a low enough concentration that it is fully dissolved in the liquefied gas solvent. The device may include an anode, a cathode, and a separator layer in contact with the ionically conducting electrolyte. A housing may enclose the ionically conducting electrolyte, the anode, the cathode and the separator layer.

8 Claims, 7 Drawing Sheets

(Method 420)

(Method 400)

(Method 525)

(Method 500)

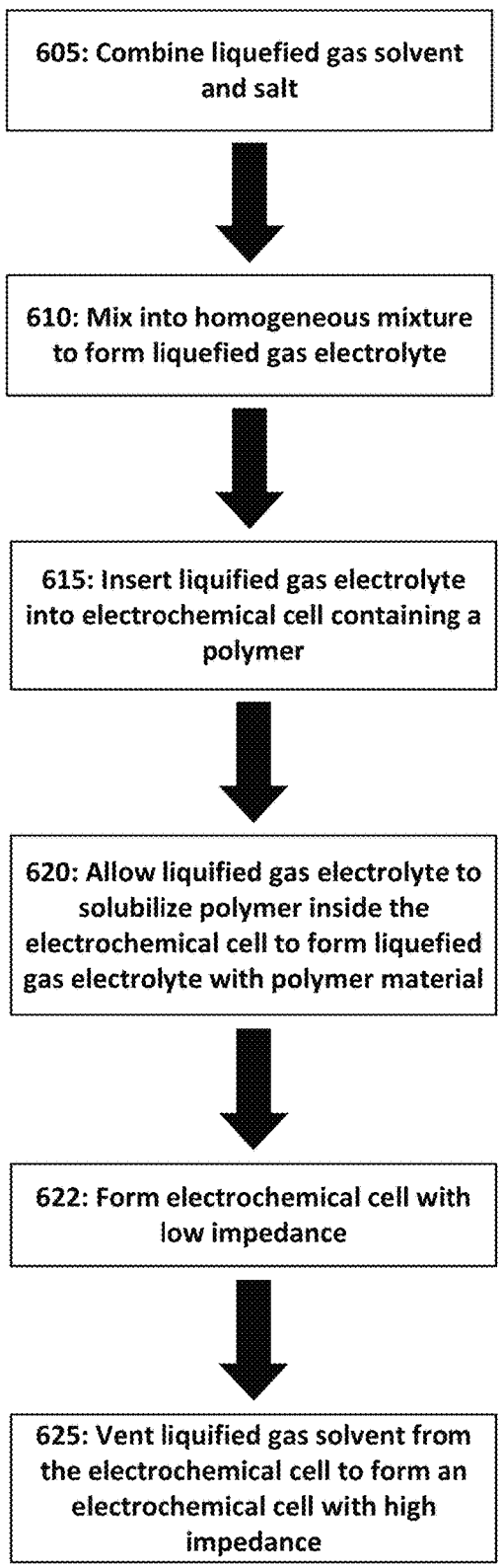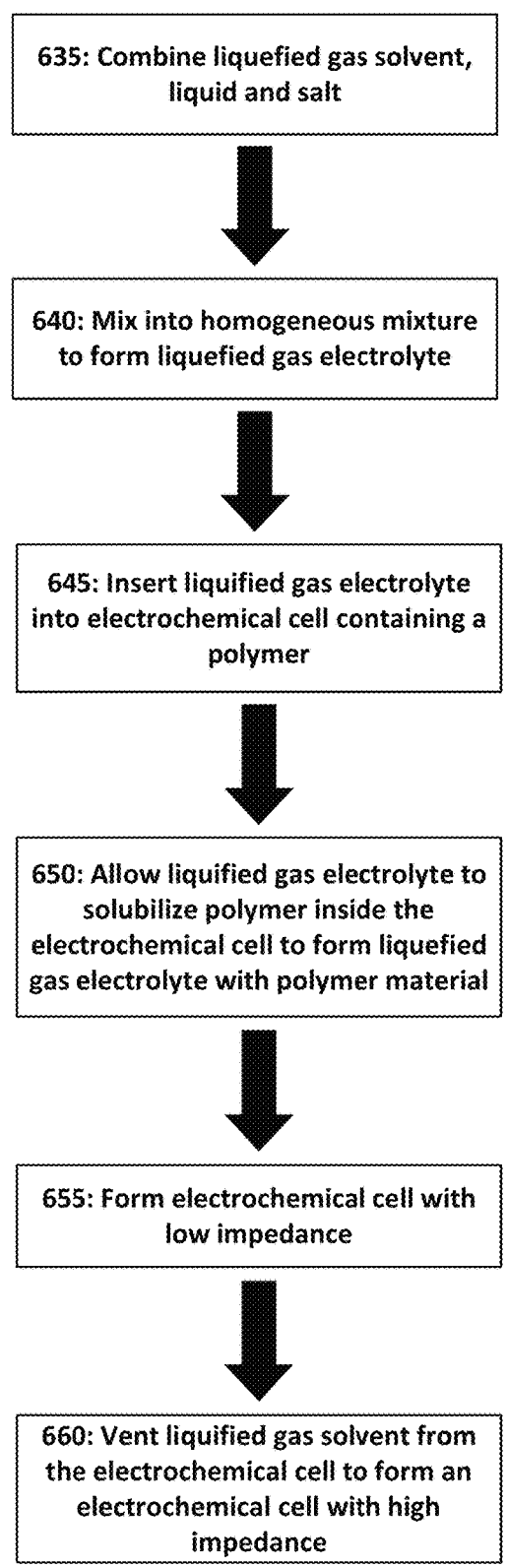
FIG. 6A
(Method 600)
FIG. 6B
(Method 630)

| Electrolyte | Cell # | Cell Impedance Before Venting (mΩ) | Average Cell Impedance Before Venting (mΩ) | Cell Impedance After Venting (mΩ) | Average Cell Impedance After Venting (mΩ) |
|---|---|---|---|---|---|
| 1M LiTFSI, 2M FEC in 45:45:10 $CH_3F:CH_2F_2:CO_2$ | Cell #1 | 37 | 36 | 408 | 398 |
| | Cell #2 | 36 | | 341 | |
| | Cell #3 | 36 | | 446 | |
| 1M LiTFSI, 2M FEC in 45:45:10 $CH_3F:CH_2F_2:CO_2$ with PET saturation | Cell #1 | 39 | 42 | 618 | 695 |
| | Cell #2 | 43 | | 762 | |
| | Cell #3 | 44 | | 706 | |

FIG. 7

ELECTROLYTE CHEMICAL FORMULATIONS INCORPORATING POLYMERS

CROSS-REFERENCE TO RELATED APPLICATIONS

This application claims priority as a continuation of PCT/US24/16784, filed on Feb. 21, 2023, and to U.S. Application 63/447,751, filed on Feb. 23, 2023; the entire contents of both of these applications are incorporated herein by reference.

This application is also related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued Aug. 10, 2021; U.S. Pat. No. 10,873,070 issued on Dec. 22, 2020; U.S. Pat. No. 11,342,615 issued on May 24, 2022; PCT/US20/26086 filed on Apr. 1, 2020; PCT/US22/31594 filed on May 31, 2022; PCT/US23/11864 filed on Jan. 30, 2023; PCT/US23/17720 filed on Apr. 6, 2023; PCT/US23/28104 filed on Jul. 19, 2023; PCT/US23/28105 filed on Jul. 19, 2023; PCT/US23/35766 filed on Oct. 24, 2023; U.S. Application 63/418,703 filed on Oct. 24, 2022; U.S. Application 63/450,745 filed on Mar. 8, 2023; U.S. Application 63/461,252 filed on Apr. 22, 2023; U.S. Application 63/461,387 filed on Apr. 24, 2023; U.S. Application 63/470,174 filed on May 31, 2023; and U.S. Application 63/534,213 filed on Aug. 22, 2023.

FIELD OF THE INVENTION

The invention relates to polymer chemicals and methods for the addition of polymer chemicals to electrolytes for energy storage devices.

BACKGROUND OF THE INVENTION

A lithium-ion battery is generally composed of the cell housing, an electrolyte, a positive electrode, a negative electrode, and an ionically conducting separator, which electrically isolates the positive and negative electrodes.

Typical electrolytes for lithium-ion batteries and related technologies consist of flammable liquid solvents. During abuse or defect conditions (for example, a short circuit), the rapid release of the energy stored in these devices can ignite the electrolyte, which increases the severity and danger of a thermal event.

This is a pervasive problem in lithium-ion batteries that has been the subject of many years of research involving many approaches, including non-flammable solvents, flame-retardant additives, polymer gel electrolytes, solid polymer electrolytes, and thermal battery cell engineering. Flammable solvents may be replaced with non-flammable liquid solvents to reduce the quantity of flammable fuel present in the battery in case of a thermal event, thereby reducing the quantity of energy released during a short circuit and thereby alleviating the creation and propagation of fire. Flame-retardant additives can also be added to the solvent, with these additives decreasing the self-extinguishing time of the overall electrolyte blend and/or burn, and forming a char barrier to prevent the propagation of fire during ignition. Polymer gel electrolytes are blends of solvents and polymers that have increased resistance compared to liquid electrolytes, which reduces the energy released during a short circuit. Solid polymer electrolytes are inherently non-volatile and less flammable than typical organic solvents, and are much less likely to ignite during a short circuit. Finally, thermal battery cell engineering may include non-flammable barriers in between battery cells to prevent the propagation of fire from one cell to the remainder of the battery pack, usually taking the form of either individual cell sheaths or longer barriers isolating groups of cells from others. Another cell engineering technique, a thermal shutdown separator, implements a low-melting polymer sandwiched between two layers of a high-melting polymer: when the lower melting point is reached, the middle layer flows into the pores of the outer layers and prevents ionic transport, increasing cell impedance and shutting down the cell's short circuit.

Each of these approaches has one or more weaknesses that has prevented the widespread adoption of safer battery devices. Standard flammable electrolyte solvents are instrumental in (1) forming passivation layers on battery electrodes during operation, which enables long life with stable operations, and (2) fully dissolving the electrolyte salt, the other key component for a battery cell to function. Non-flammable solvents are inferior to conventional flammable solvents in both regards, which prevents the complete replacement of flammable solvents. Flame-retardant additives can reduce burn time of flammable electrolytes, but they do not render the solvents non-flammable, and thus fire in the case of a short circuit cannot be completely prevented. Polymer gel electrolytes reduce flammability during short circuits by increasing the resistance of the electrolyte and therefore the current experienced during a short circuit. This increased resistance, however, negatively impacts the battery cell's performance during nominal operation. Solid polymer electrolytes are less flammable than standard liquid electrolytes; however, the conductivity (both in the bulk of the material and at the interfaces with the electrodes), chemical compatibility, and scalability must be researched and perfected before solid polymer electrolytes are commercially implemented. Also, polymer electrolytes (gel or solid) may be manufactured by mixing a monomer with a salt, then activating polymerization of the monomer, which creates a salt trapped within the polymer matrix. Another method to create a polymer electrolyte includes solubilizing the polymer in a solvent along with the salt. The solvent is then removed through evaporation, and the polymer is redeposited along with the salt, creating a conductive polymer electrolyte. This process, however, is hazardous because the solvents are highly toxic. The process is also highly inefficient because it requires a significant energy expenditure to heat the solvent for evaporation, which damages/partially decomposes the polymer matrix or salt and creates a non-uniform distribution of salt within the polymer matrix. Finally, engineering solutions may function to prevent or to delay the propagation of fire from a failed cell to the rest of the battery, at a cost of added mass and manufacturing complexity, but are less effective at reducing the energy released from the failed cell, which remains hazardous to the surrounding structures and to personnel.

An improved method for creating polymer electrolytes is therefore needed to overcome these shortcomings and manufacturing obstacles.

SUMMARY OF THE INVENTION

The prior disclosures listed above have described the preparation, implementation, and inherent advantages of the liquefied gas electrolyte invention. The present invention discloses methods to add a polymer material to a liquefied gas electrolyte solution for use in an electrochemical energy storage device such as a lithium-ion battery or a related technology to further improve the battery cell's safety.

During abuse conditions such as a short circuit, a battery with a liquified gas electrolyte increases its internal pressure until the built-in vent is activated (or until abuse such as crushing or nail penetration punctures the seal). Once the seal of the battery cell can is broken, the liquified gas components of the electrolyte vaporize and vacate the cell can, leaving only the non-volatile components such as the electrolyte salt, any non-gaseous additives, the anode, the cathode, and the separator membrane. In the case of a traditional liquid electrolyte, the ionic conductivity of the electrolyte permits a short circuit to discharge the cell as rapidly as possible, potentially leading to thermal runaway. With a liquefied gas electrolyte, the non-volatile components left within the cell do not form a conductive electrolyte to support this discharge. However, when substantial liquid additive is present, and/or in a case where gas molecules are tightly coordinated to lithium ions in the salt and do not vacate the cell as quickly as expected, the cell impedance may remain low enough for thermal runaway to proceed unchecked.

The addition of a dissolved polymer to a liquefied gas electrolyte solution in a lithium-ion battery or in similar device serves to protect against thermal runaway. During normal operation, the polymer is completely dissolved in the liquefied gas electrolyte, likely coordinating with electrolyte salts in solution. When venting—as the liquefied gas solvent vaporizes and exits the cell—the polymer is no longer solubilized and precipitates as a solid throughout the cell, with electrolyte salt and non-volatile additives incorporated in the aforementioned precipitated polymer. This newly solid polymer strongly coordinates the electrolyte salt, which increases cell impedance such that a short circuit will not lead to thermal runaway.

The present invention also discloses novel methods for creating polymer electrolytes using safer liquefied gas solvents, allowing for highly uniform polymer electrolyte matrices without heating, which in turn allows the polymer and salt to remain undamaged through the manufacturing process. A polymer and a salt may be added together into a pressure vessel. An optional liquid solvent and/or additive may also be added to the pressure vessel. The pressure vessel may then be filled with a liquefied gas solvent through a valve. The polymer, salt and optional liquid solvent/additive are allowed to mix such that the polymer and the salt are dissolved into solution. After the polymer and the salt are solubilized into solution, the liquefied gas solvent is allowed to evaporate through the valve on the pressure vessel. Due to the high volatility of the liquefied solvent, no heating is necessary to drive off the solvent. The polymer will quickly precipitate out of solution with the salt incorporated within it, creating a polymer electrolyte. The optional liquid solvent/additive added to the mixture is also contained within the polymer matrix and further aids in the polymer electrolyte conductivity.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 6A is a flow chart illustrating the method of manufacturing an electrochemical device with high impedance using a liquefied gas electrolyte with a polymer.

FIG. 6B is a flow chart illustrating the method of manufacturing an electrochemical device with high impedance using a liquefied gas electrolyte with a polymer and an optional liquid solvent/additive.

FIG. 7 shows a table illustrating the change in cell impedance before and after venting when a polymer is integrated into the liquefied gas electrolyte.

DETAILED DESCRIPTION OF THE INVENTION

Figure 1:
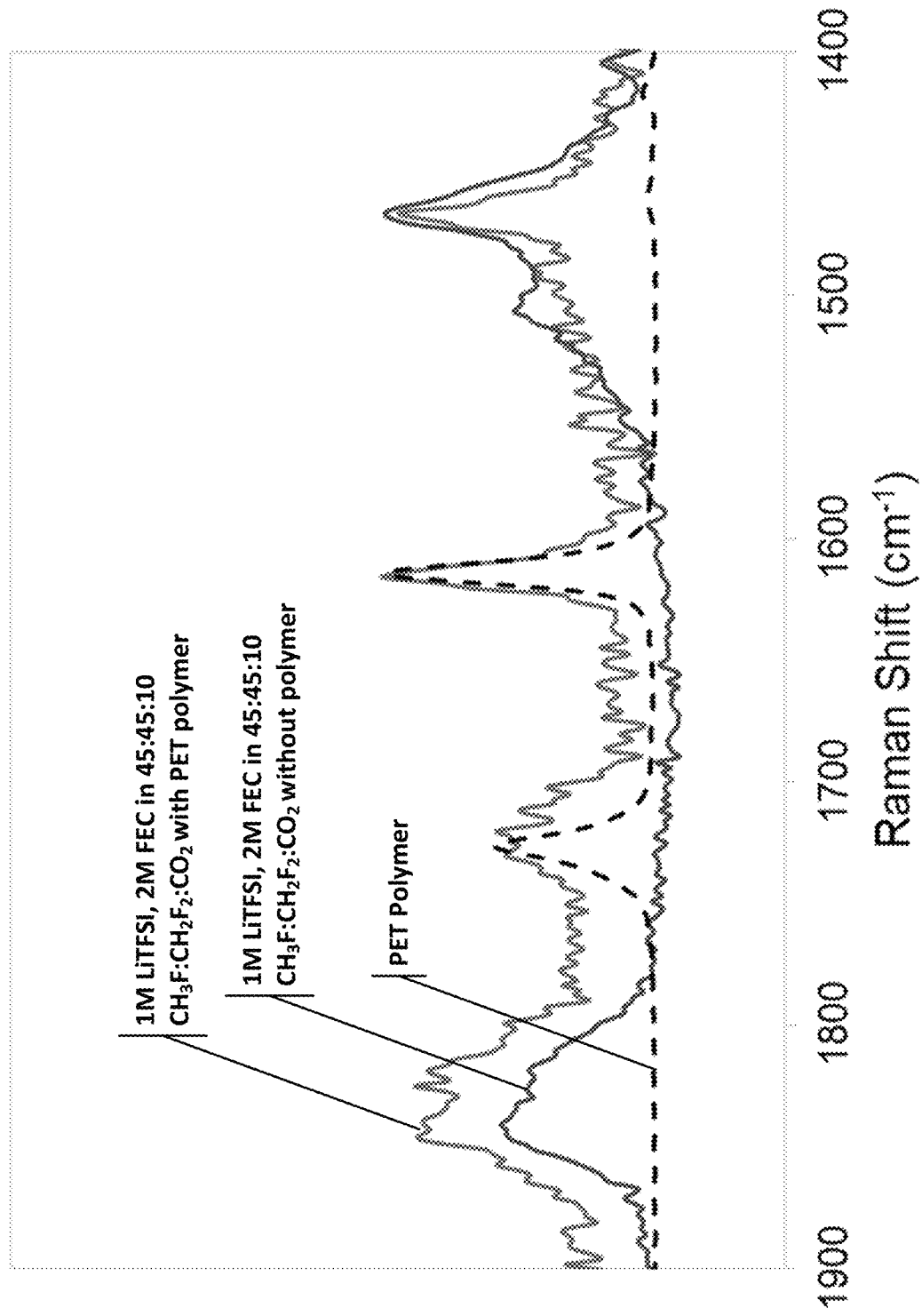
FIG. 1 displays the Raman spectra for a base PET polymer, a liquefied gas electrolyte, and a liquefied gas electrolyte saturated with a PET polymer.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

| Electrochemical Device | 5 |
| Positive Electrode/Cathode | 10 |
| Separator | 15 |
| Negative Electrode/Anode | 20 |
| Positive Terminal | 25 |
| Negative Terminal | 30 |
| Housing | 35 |
| Electrolyte | 40 |
| Method of Manufacturing a Polymer or Gel Electrolyte | 400 |
| Steps in Method 400 | 405-415 |
| Method of Manufacturing a Polymer or Gel Electrolyte with Optional Liquid Solvent/Additive | 420 |
| Steps in Method 420 | 425-435 |
| Method of Manufacturing an Electrochemical Device | 500 |
| Steps in Method 500 | 505-520 |
| Method of Manufacturing an Electrochemical Device with an Optional Liquid Solvent/Additive | 525 |
| Steps in Method 525 | 530-545 |
| Method of Manufacturing an Electrochemical Device | 600 |
| Steps in Method 600 | 605-625 |
| Method of Manufacturing an Electrochemical Device with an Optional Liquid Solvent/Additive | 630 |
| Steps in Method 630 | 635-660 |

It has been discovered that liquefied gas electrolytes with a dissolved polymer (added to an electrochemical device such as a lithium-ion battery cell) can be formulated such that the polymer has no adverse impact on the performance of the electrochemical device during nominal operation, but upon abuse or failure, the polymer can perform a function that prevents thermal runaway and fire. It has been discovered that a number of polymers, not normally able to be dissolved in traditional battery electrolytes, may be dissolved in liquefied gas electrolytes with specific electrolyte formulations and under particular conditions. The selection of materials and their concentrations may be tuned to the desired application.

It was discovered that several polymers can be solubilized into liquefied gas electrolytes. For example, FIG. 1 shows Raman spectra for (1) pure polyethylene terephthalate (PET) polymer, (2) the liquefied gas electrolyte containing 1.0 M LiTFSI, 2.0 M FEC in a liquefied gas solvent comprising a molar ratio of 45:45:10 difluoromethane:methyl fluoride:carbon dioxide, and (3) a saturated solution of PET in the electrolyte described in (2). It is clear that the Raman spectra of (3) contains peaks from both the (1) and (2), showing high degree of solubility within the liquefied gas electrolyte, forming a liquefied gas electrolyte and polymer mixture. The present inventors have studied other polyesters and other polymer families, such as polybutylene terephthalate, polyketone, polystyrene, cellulose, cellulose acetate, cellulose acetate butyrate, polyethylene oxide (aka, polyethylene glycol), carboxymethyl cellulose, polyacrylic acid, polyacrylonitrile, polyamide, aramid, polyethersulfone, poly(ethylene succinate), polylactic acid, and/or polycaprolactone. Polymers show varying degrees of solubility within the liquefied gas electrolyte and causal relationships have been drawn between the glass transition temperature of the polymer and solubility. For some polymers and electrolytes, the lower the glass transition temperature, the higher the degree of solubility. For other polymers and electrolytes, the higher the glass transition temperature, the lower the degree of solubility.

Figure 2:
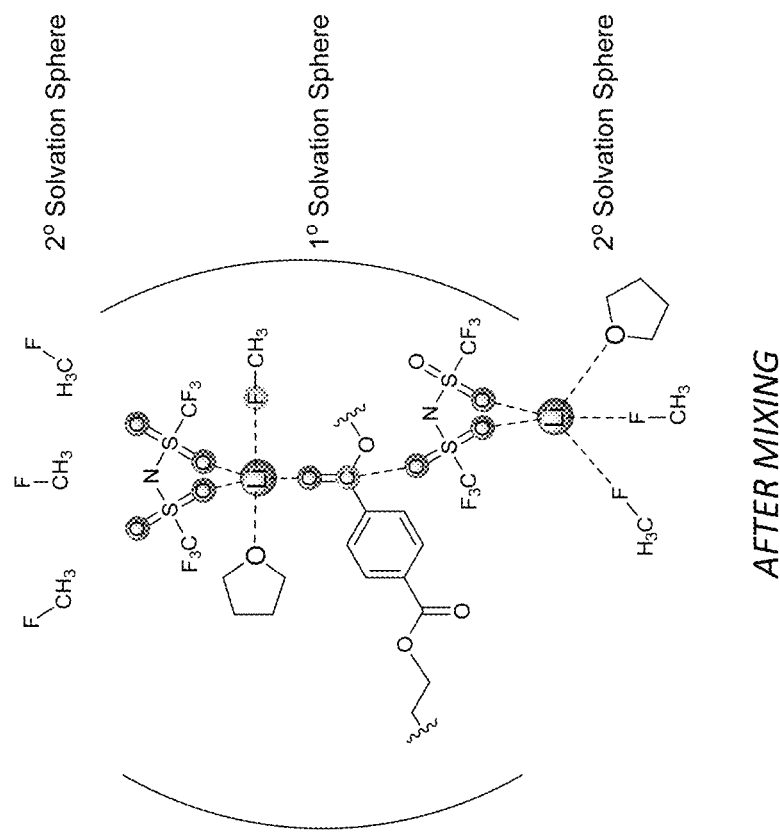
FIG. 2 is a schematic showing the PET polymer on a molecular level before mixing and after mixing with the liquefied gas electrolyte and its proposed solvation chemistry.
Figure 2:
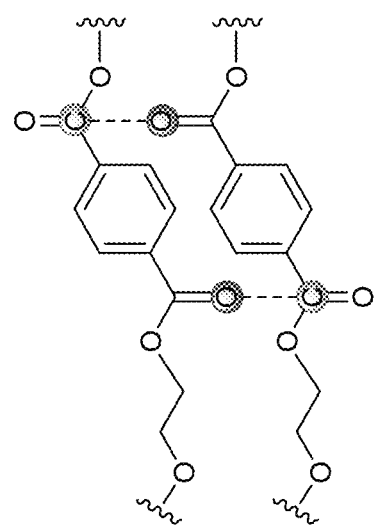

Typically, strong intermolecular interactions present between polymer chains impart to the polymer mechanical rigidity and other physical and chemical properties. It is thought that the salt cation interferes with these strong interactions between polymer chains, leading to an increase in polymer solubility in the liquefied gas electrolyte. This is shown schematically in FIG. 2. Before mixing, the carbonyl groups help associate polymer chains to one another through mutual dipole interactions. After combination and mixing with the liquefied gas electrolyte, the lithium cation (in this example) is solvated by the carbonyl oxygens and aids in disassociating the polymer chains to aid in polymer solubility. In this example, a LiTFSI salt is used in combination with a tetrahydrofuran liquid solvent and a methyl fluoride liquefied gas solvent. Since it is hypothesized that the polymer requires the cation to aid in disassociating the polymer chains, the solubility limit into the liquefied gas electrolyte would be strongly correlated to the salt concentration within the electrolyte. For example, if there is 1 mole of cations within the electrolyte, and each cation binds to a single carbonyl group on a polymer chain, then one can expect the solubility limit of that polymer within the electrolyte to be soluble to about the equivalent of 1 mole of carbonyl groups. Some polymers may have a higher or lower ratio of number of cations to polymer carbonyl chain. Some polymers may not have a carbonyl group but may have another group to bind the cation to. Sometimes the ratio of cation to polymer binding group would be 1 to 1. Some other polymers show the ratio to be 2 to 1, 3 to 1, 4 to 1, 5 to 1, or higher. Other polymers would show the ratio to be 1 to 5, 2 to 5, 3 to 5 or 4 to 5, or lower.

Figure 3:
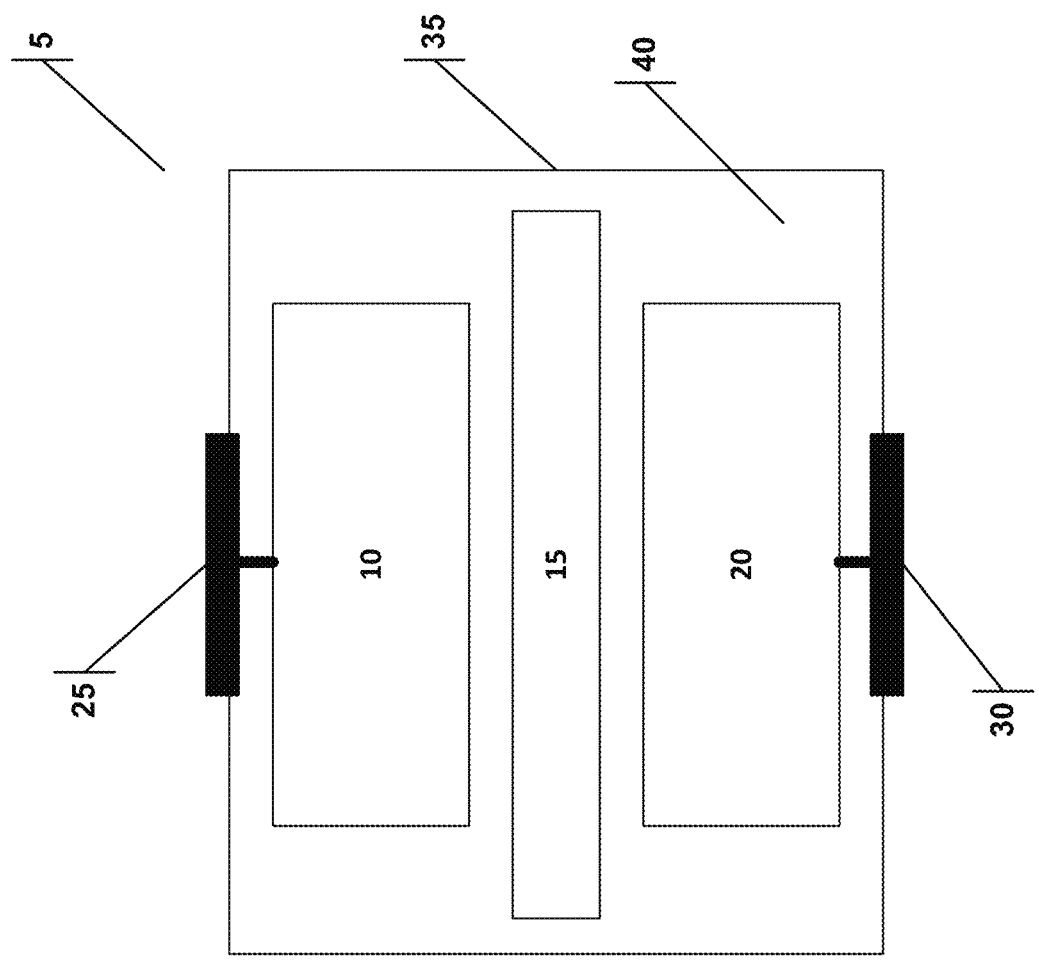
FIG. 3 is a schematic showing the electrochemical device assembly with an integrated electrolyte.

After mixing the liquefied gas electrolyte and the polymer, a liquefied gas electrolyte with polymer material is formed. There may be several uses for such a chemical mixture, one of which is as an electrolyte in an electrochemical device. FIG. 3 schematically illustrates an electrochemical device 5 with an electrode stack consisting of a positive electrode 10, a negative electrode 20, and an ionically conducting, but electrically isolating, separator membrane 15. The stack is immersed in an electrolyte mixture 40. The electrode stack and the electrolyte 40 are also housed inside a battery cell housing 35, with a positive terminal 25 and negative terminal 30 accessible from outside of the housing 35. The battery cell housing 35 is structured such that it can maintain a pressure required to ensure that the liquefied gas electrolyte is maintained under pressure and in a liquid phase. The electrolyte 40 can be a liquid electrolyte, a liquefied gas electrolyte, which may also contain some liquid solvent or additive, or a liquefied gas electrolyte containing a polymer.

Polymer or gel electrolytes for lithium-ion batteries are well-known; the polymer combines with a traditional liquid solvent to form a gel, which has a lower conductivity than a traditional liquid electrolyte. The present invention uses a method that avoids the gel state completely: during normal operation, the electrolyte is a liquid solution containing dissolved polymer in addition to the usual dissolved lithium salts. In a failure situation, the gaseous electrolyte solvent immediately evaporates and vents from the cell. The solvent is the primary chemical species dissolving the polymer, such that during venting the polymer precipitates within the cell in solid form. This phenomenon, unique to the liquefied gas electrolyte system, ensures that the polymer only increases cell impedance during failure.

Figure 4B:
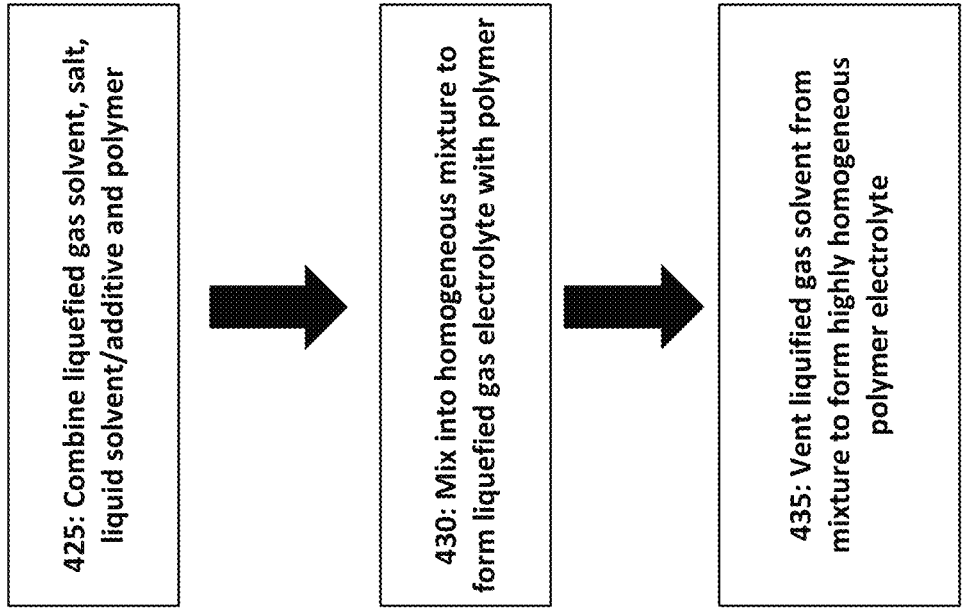
FIG. 4B is a flow chart illustrating the method of manufacturing a polymer or gel electrolyte, with an optional liquid solvent/additive.
Figure 4A:
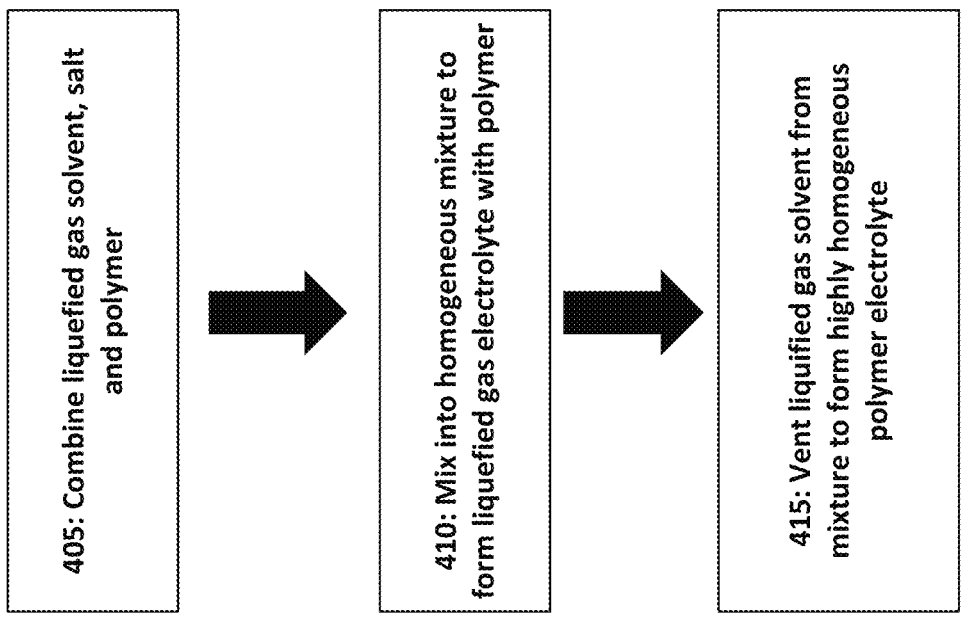
FIG. 4A is a flow chart illustrating the method of manufacturing a polymer or gel electrolyte.

There can also be benefits to forming a polymer or gel electrolyte for low pressure battery cells. To improve the manufacture of these materials, a liquefied gas solvent may be used as an intermediate. Two methods for forming the final polymer or gel mixture are shown in FIGS. 4A-4B. FIG. 4A illustrates a method 400 wherein a liquefied gas solvent, a salt, and a polymer are combined into a vessel (step 405), mixed to form a homogeneous mixture where the salt and polymer are solubilized into solution (step 410), and finally the liquefied gas solvent to vented off to form a highly homogeneous polymer electrolyte material (step 415). A similar method 420 is shown in FIG. 4B, wherein a liquefied gas solvent, a salt, a liquid solvent and/or additive, and a polymer are combined into a vessel (step 425), mixed to form a homogeneous mixture, where the salt, liquid solvent/additive, and polymer are solubilized into solution (step 430), and, finally, the liquefied gas solvent is vented off to form a highly homogeneous polymer electrolyte material containing the liquid solvent/additive (step 435). The formed polymer electrolyte material can be used in electrochemical devices to improve performance due to the high degree of homogeneity. Also, methods 400 and 420 obviate the need for a heating step, lowering the cost of manufacture. While methods 400 and 420 are disclosed as producing a mixture of a liquified gas solvent, a salt, a liquid solvent/additive and a polymer, these methods can be applied to mixtures with more than one liquified gas solvent, salt, liquid solvent/additive and/or polymer.

Figures 5A, 5B:
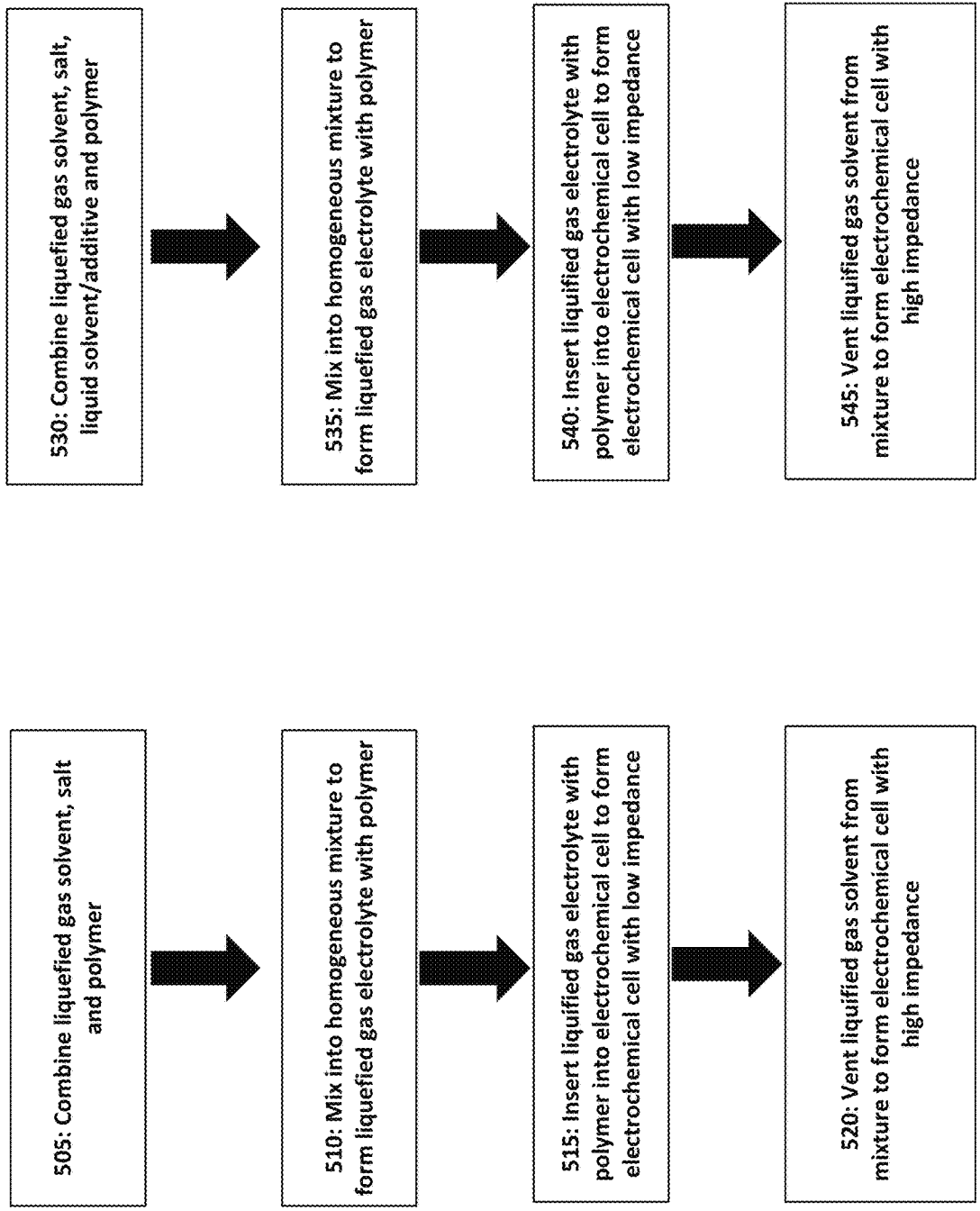
FIG. 5A is a flow chart illustrating the method of manufacturing an electrochemical device with high impedance using a liquefied gas electrolyte with a polymer.
FIG. 5B is a flow chart illustrating the method of manufacturing an electrochemical device with high impedance using a liquefied gas electrolyte with a polymer and an optional liquid solvent/additive.

As an alternative to the methods shown in FIGS. 4A and 4B, the liquefied gas electrolyte with a polymer may itself be injected in to the electrochemical device. FIGS. 5A and 5B illustrates this process, wherein a liquefied gas electrolyte is formed with the polymer (method 500 steps 505 and 510; method 525 steps 530 and 535) and inserted to the battery cell, forming a low impedance battery cell (method 500 step 515; method 525 step 540). After venting (due to any number of circumstances such as a puncture, crushing, or over-temperature event), the liquefied gas solvent is vented from the cell, leaving behind an electrolyte primarily composed of polymer (method 500, step 520; method 525 step 545). This polymer electrolyte can have a lower conductivity when compared to the liquefied gas electrolyte with polymer material mixed in. Thus, after venting, the electrochemical device impedance is quickly increased. The increased impedance will lower the heating due to the device's internal short circuit, improving the safety of the device. FIG. 5A shows this method 500 using a liquefied gas solvent mixed with a salt and polymer forming a liquefied gas electrolyte with polymer (steps 505 and 510). FIG. 5B shows this method using a liquefied gas solvent mixed with a salt, an optional liquid solvent/additive, and a polymer forming a liquefied gas electrolyte with polymer (steps 530 and 535). While methods 500 and 525 are disclosed as mixture of a liquified gas solvent, a salt, a liquid solvent/additive and a polymer, these methods can be applied to mixtures with more than one liquified gas solvent, salt, liquid solvent/additive and/or polymer.

In yet another alternative, a liquefied gas electrolyte containing no polymer may be mixed prior to insertion into the electrochemical device. Prior to this insertion, the electrochemical device contains the polymer. This polymer may be added to the cell prior to electrolyte injection in any number of ways, including as a binder material for the electrode or on the tape within the cell (e.g., tape substrate or tape adhesive). Upon injection, the electrolyte can begin to solubilize the polymer material to form a mixture resulting in a liquefied gas electrolyte with polymer material. This results in a device with a relatively low impedance. Upon venting, the liquefied gas solvent is removed, and the device impedance can quickly increase. FIG. 6A shows the method 600 without the optional liquid solvent/additive within the liquefied gas electrolyte, whereas FIG. 6B shows the method 630 with the optional liquid solvent/additive.

In liquefied gas electrolytes with an optional liquid solvent, the electrochemical device may still maintain relatively low impedance even after the liquefied gas solvent venting because the liquid solvent may play the role of solvent allowing fast ion transport. However, with the addition of a polymer, the polymer acts to "pin down" the ion movement such that the device impedance is now higher. The higher device impedance after venting is preferred from a safety perspective. However, the device should maintain low impedance prior to venting to ensure optimal performance.

FIG. 7 shows a table having 6 different cells: three cells with a liquefied gas electrolyte containing 1 M LiTFSI, 2 M FEC in a liquefied gas solvent having a 45:45:10 difluoromethane:methyl fluoride:carbon dioxide molar ratio, and three different cells having the same electrolyte composition but saturated with a PET polymer. The cell impedance of the two groups of cells prior to venting is comparable, showing an average of 36 mΩ for the cells with no polymer and an average of 42 mΩ for the cells with a polymer. After venting, the impedance of the cells with no polymer increases to 398 mΩ, but the impedance of the cells with a polymer increases to 695 mΩ. This ~75% increase in cell impedance of the cells having the polymer vs. the cells not having the polymer improves cell safety by lowering the heat generated through a short circuit event. Other polymers may be selected to increase the cell impedance, preferably increasing the impedance by at least 25% vs. a non-polymer cell.

The polymer can be added to the electrolyte during the electrolyte manufacturing and blending process or added to the dry device and mixed with electrolyte after electrolyte addition into the device. The polymer material may be added to the dry device in a number of methods, including as an additive, or as a binder to the positive or negative electrode, or as a component of the tape that binds the electrode assembly. The electrolyte is injected into the device, as normal. The concentration of the polymer additive in the electrolyte is chosen such that a gel electrolyte is not formed; the liquefied gas, salt, and additive blend remains a liquid.

During normal operation of the electrochemical device, the polymer does not affect the nominal performance in a significant way. Once the liquefied gas components are vented from the cell, the impedance of the device increases significantly more rapidly than an analogous case where no polymer additive was included.

Prior art implementations of polymers as safety mechanisms in lithium-ion and similar electrochemical devices are fundamentally different than the present invention. First, a polymer gel electrolyte leads to a bulk increase in resistance of the entire electrolyte, regardless of nominal or off-nominal operation; the polymer is a major component of the electrolyte, which has different properties and design characteristics to a liquid or liquefied gas electrolyte. Second, shutdown separators exist consisting of three layers: two polypropylene layers sandwiching a polyethylene layer. During thermal abuse or the onset of thermal runaway, the polyethylene layer melts, filling the pores of the polypropylene layers and preventing the migration of Li ions in the electrolyte. This represents a design consideration of the electrode stack that must be implemented by the cell manufacturer. It is a shutdown mechanism that responds only in case of an increase in temperature that reaches the melting point of polyethylene: thermal abuse or thermal runaway must already be in progress for it to activate. In contrast, the present invention's safety feature is triggered not only by thermal abuse, but also by any damage to the seal of the battery cell can at a nominal temperature such as at room temperature. Physical abuse, such as crushing, can sometimes lead to a compromised cell can without an immediate hard short circuit, resulting in a latent risk of thermal runaway still present in a liquid device. With a liquefied gas cell including the polymer, the vent mechanism preemptively shuts down the cell, and the risk of thermal runaway from short circuit after the fact (due to handling or shifting of components in the crushed cell during cleanup) is much reduced or eliminated.

It is further known to those in the art that transitional metal dissolution from the cathode lowers the cell capacity and reduces the life of the cell. Similarly, polysulfide dissolution from a sulfur cathode can also lower cell capacity and the life of the cell. Because the solubilized polymer can coordinate with these transition metal ions or polysulfide chains, the polymer may prevent further cell degradation. Because the polymer chains can be tailored to be large enough to not pass through the separator membrane, transition metals and polysulfides will not be able to reach the negative electrode and would therefore not be able to degrade cell performance. This will allow the cells to maintain higher levels of performance for longer, including higher capacity, higher power, and longer cycle life.

The construction of an electrochemical device may include an ionically conducting electrolyte comprised of a liquefied gas solvent, a salt, and a polymer. The salt is preferably LiTFSI, LiFSI, LiPF$_6$, LiBOB, LiBF$_4$, LIDFOB, and/or LiNO$_3$. The polymer is preferably polyethylene terephthalate, polybutylene terephthalate, polyketone, polystyrene, cellulose, cellulose acetate, cellulose acetate butyrate, polyethylene oxide (aka polyethylene glycol), carboxymethyl cellulose, polyacrylic acid, polyacrylonitrile, polyamide, aramid, polyethersulfone, poly(ethylene succinate), polylactic acid, and/or polycaprolactone. The polymer preferably has polar functional groups which can easily bind to either the cation or anion of the salt to enable the polymer to slow ionic conductivity of the electrolyte solution. The polymer is at a low enough concentration that it is fully dissolved in the liquefied gas solvent, and may be in the molar concentration range from about 1 mM to about 10 M. The liquefied gas solvent has a vapor pressure above 100 kPa at a temperature of 293.15 K, allowing the liquefied gas to vent from the device during a failure.

The device includes an anode, a cathode, and a separator layer in contact with the ionically conducting electrolyte. A housing encloses all these elements. The anode is preferentially constructed of graphite, carbon, activated carbon, vanadium oxide, lithium titanate, lithium metal, sodium metal, calcium metal, magnesium metal, aluminum metal, and/or zinc metal. The cathode is preferentially constructed of titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, and/or lithium nickel cobalt aluminum oxide.

While operations may be depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made without departing from the scope and spirit of this invention, based on what is described and illustrated in this patent document.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An electrochemical device (5), comprising:
   an ionically conducting electrolyte (40) comprising a salt, a polymer, and a liquefied gas solvent with a vapor pressure above 100 kPa at a temperature of 293.15 K;
   a housing (35) enclosing the ionically conducting electrolyte (40);
   an anode (20), a cathode (10), and a separator layer (15) in contact with the ionically conducting electrolyte (40);
   wherein:
      the salt comprises a concentration of cations;
      the polymer comprises a concentration of cation-to-polymer binding groups;
      the cation-to-polymer binding group concentration is at least equal to the concentration of cations; and
      the polymer is selected such that the impedance of the device (5) increases upon venting the liquefied gas solvent from the device (5), by at least 25% as compared to the post-venting impedance of the similarly constructed device without a polymer.

2. The device (5) of claim 1, wherein the ionically conducting electrolyte (40) further comprises a liquid solvent and/or a liquid additive.

3. The device (5) of claim 1, wherein the housing (35) encloses the anode (20), the cathode (10) and the separator layer (15).

4. The device (5) of claim 1, wherein the polymer is selected from the group consisting of:
   polyethylene terephthalate, polybutylene terephthalate, polyketone, polystyrene, cellulose, cellulose acetate, cellulose acetate butyrate, polyethylene oxide, carboxymethyl cellulose, polyacrylic acid, polyacrylonitrile, polyamide, polyethersulfone, poly(ethylene succinate), polylactic acid, and polycaprolactone.

5. The device (5) of claim 1, wherein the molar concentration of the polymer ranges from about 1 mM to about 10 M.

6. The device (5) of claim 1, wherein the salt is selected from the group consisting of:

LiTFSI, LiFSI, LiPF$_6$, LiBOB, LiBF$_4$, LiDFOB, and LiNO$_3$.

7. The device (5) of claim 1, wherein the anode (20) is selected from the group consisting of:

graphite, carbon, activated carbon, vanadium oxide, lithium titanate, lithium metal, sodium metal, calcium metal, magnesium metal, aluminum metal, and zinc metal.

8. The device (5) of claim 1, wherein the cathode (10) is selected from the group consisting of:

titanium disulfide, molybdenum disulfide, lithium iron phosphate, lithium cobalt phosphate, lithium nickel phosphate, lithium cobalt oxide, lithium nickel cobalt oxide, lithium nickel manganese oxide, lithium nickel manganese cobalt oxide, and lithium nickel cobalt aluminum oxide.

* * * * *